(12) United States Patent
Yoon et al.

(10) Patent No.: US 6,442,783 B1
(45) Date of Patent: Sep. 3, 2002

(54) DOCK LEVELER WITH RUN-OFF BARRIER CONFIGURATION

(75) Inventors: Young Z. Yoon; Robert J. Chirico, both of Indianapolis, IN (US)

(73) Assignee: Genquip Corporation

( * ) Notice: Subject to any disclaimer, the term of this patent is extended or adjusted under 35 U.S.C. 154(b) by 0 days.

(21) Appl. No.: 09/592,580

(22) Filed: Jun. 12, 2000

(51) Int. Cl.⁷ .................................................. E01D 1/00
(52) U.S. Cl. ........................................ 14/71.1; 14/69.5
(58) Field of Search ................................ 14/69.5, 71.1, 14/71.3, 71.5

(56) References Cited

U.S. PATENT DOCUMENTS

| | | |
|---|---|---|
| 3,486,181 A | 12/1969 | Hecker, Jr. et al. |
| 3,636,578 A | 1/1972 | Dieter |
| 3,974,537 A | 8/1976 | Ellis et al. |
| 4,065,824 A | 1/1978 | Ellis et al. |
| 4,525,887 A | 7/1985 | Erlandsson et al. |
| 4,665,579 A | 5/1987 | Bennett et al. |
| 4,689,846 A | 9/1987 | Sherrod |
| 4,865,507 A * | 9/1989 | Trickle .................. 414/401 |
| 4,920,598 A | 5/1990 | Hahn |
| 4,935,979 A | 6/1990 | Walker et al. |
| 5,040,258 A | 8/1991 | Hahn et al. |
| 5,157,801 A | 10/1992 | Alexander |
| 5,195,205 A | 3/1993 | Cook |
| 5,311,628 A | 5/1994 | Springer et al. |
| 5,333,339 A | 8/1994 | Larsen |
| 5,343,583 A | 9/1994 | Cook |
| 5,450,643 A * | 9/1995 | Warner .................. 14/69.5 |
| 5,452,489 A | 9/1995 | Gelder et al. |
| 5,457,838 A | 10/1995 | Gelder et al. |
| 5,553,343 A | 9/1996 | Alexander |
| 5,621,938 A * | 4/1997 | Warner .................. 14/69.5 |

* cited by examiner

*Primary Examiner*—Gary S. Hartmann
*Assistant Examiner*—Kristine Markovich
(74) *Attorney, Agent, or Firm*—H. Jay Spiegel

(57) ABSTRACT

A dock leveler with run-off barrier configuration is disclosed in two embodiments. In a first embodiment, the dock leveler includes a faceplate, a deck, and a lip with the faceplate mounted on the end of a dock, the deck pivotably mounted to the faceplate and the lip pivotably mounted to the deck. The deck is pivotably mounted to the faceplate via a first linkage including two legs pivotably mounted to each other as well as to each of the faceplate and the deck. The faceplate and the lip are interconnected with a second linkage including two arms pivotably connected together and pivotably connected to each of the faceplate and the deck, respectively. Gussets are provided on a portion of the faceplate and include recesses terminating in upwardly turned detents. In one configuration of the dock leveler, the termination edge of the lip may be received within the recesses in the gussets so that the deck portion acts as a sturdy barrier. In a second embodiment, an actuating lever is mounted under the deck and has an interconnection with the second portion of the faceplate via a flexible connector such as, for example, a chain or cable.

20 Claims, 9 Drawing Sheets

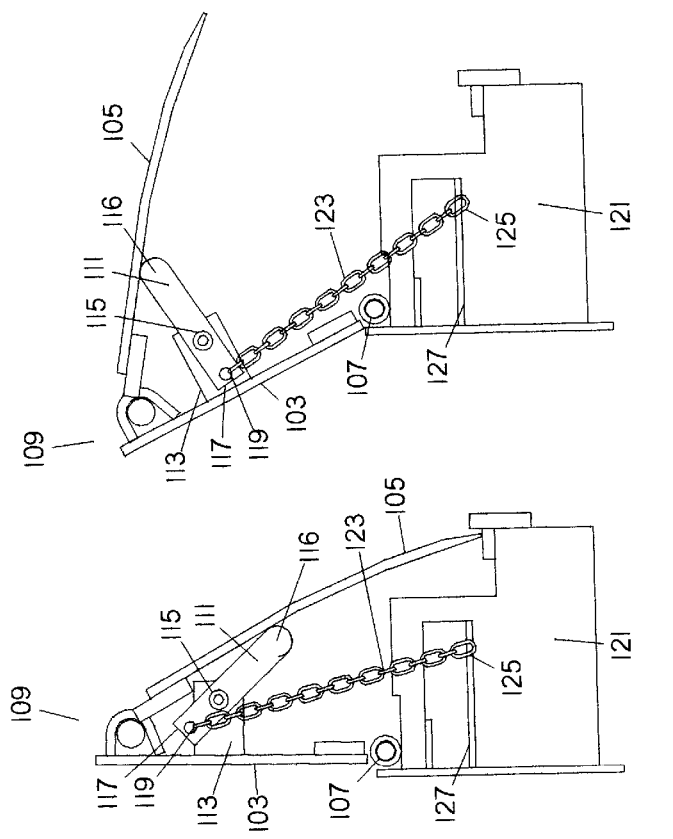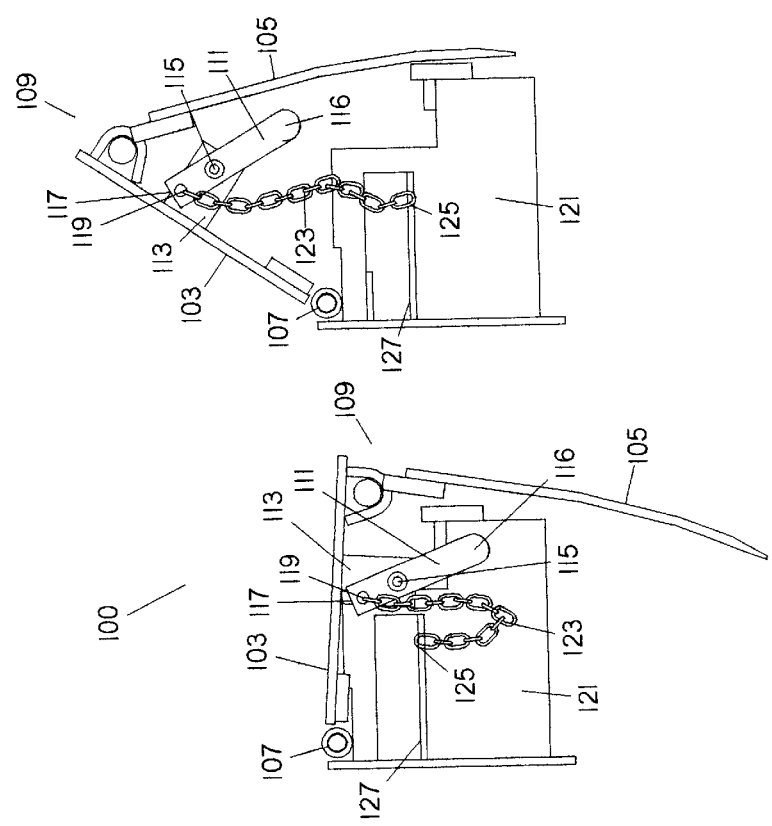

DOCK LEVELER WITH RUN-OFF BARRIER CONFIGURATION

BACKGROUND OF THE INVENTION

The present invention relates to a dock leveler with run-off barrier configuration. A dock leveler is a device designed to bridge the gap between a loading dock and the surface of a truck or trailer bed. Under most circumstances, the floor of the truck bed and the top of the loading dock are at unequal heights and most dock levelers known in the prior art can accommodate some degree of vertical range of mis-match in these elevations.

There are three main categories of dock levelers, namely, pit levelers, vertically stored levelers, and edge of dock levelers. Pit levelers are designed to reside in a formed pit in the dock and are usually designed to accommodate a comparatively large height mis-match between the top surface of a loading dock and the surface of a truck bed, as much as 12 inches or more in some cases. Pit levelers provide unobstructed access to the dock and tend to be more expensive to manufacture and install than other types of dock levelers.

Vertically stored levelers do not require as much concrete work when they are installed and can often accommodate as great a height mis-match as is the case with a pit leveler. The vertically stored leveler has severe shortcomings in that it is extremely expensive to install and with a vertically stored leveler in place, access to the dock face is unobtainable.

A third type of dock leveler is known as the edge of dock leveler and attaches to the face of the dock where it intersects with the surface of the dock. Edge of dock levelers are more economical to install than other types of levelers in that less concrete work is required and in a similar manner as a pit leveler, edge of dock levelers provide unobstructed access to the dock as desired such as for end loading of a truck. However, edge of dock levelers known in the prior art do have a limitation in that, as known, they have a limited ability to accommodate a severe height mis-match between the dock surface and truck bed surface, usually, no greater than around 5 inches.

Edge of dock levelers as they are known in the prior art typically consist of three primary components, the faceplate, the deck and the lip. The faceplate is stationary and solidly fixed to the dock face. The deck rotates around the faceplate, and the lip rotates around the opposite end of the deck. When stored, the deck is substantially horizontal and the lip is angled approximately 90 degrees with respect to the deck hanging downward by gravity. To use such an edge of dock leveler, the deck is rotated back engaging a mechanism readies the lip for extension. The deck is then rotated forward and the engaged mechanism causes the lip to rotate around the deck. The now extended edge of dock leveler rests on the truck bed creating the bridge for loading and unloading of the truck. As the lip rests on the truck bed, the mechanism disengages. To return the edge of dock leveler for another use, the deck is rotated back some amount and the lip falls. After the lip falls off the truck bed, the deck is rotated forward until it rests in the initial cycle orientation. If the truck pulls away from an extended edge of dock leveler, the leveler will fall back to the initial, stored configuration.

Edge of dock levelers are also known to employ other activation mechanisms. Often a counterbalance spring or counterweight mechanism is installed to lessen the force required to activate the leveler. Other methods include powering the unit with hydraulics, pneumatics, and/or electromechanical power. On both ends of a typical edge of dock leveler, bumpers are often provided that prevent a truck from impacting the leveler when in the stored position.

Usually, when stored, both pit levelers and edge of dock levelers provide unobstructed access to the dock. Sometimes this can be advantageous, such as when a truck is loaded to the extreme rear not allowing room for the lip of the leveler to rest on the truck bed. But often, the unobstructed access provided by traditional storage position of both prior art pit levelers and prior art edge of dock levelers can allow equipment to run off the dock. A dock is typically around 3½ feet off the ground and free fall from that distance can easily cause equipment damage, personal injury, or even death.

One type of edge of dock leveler has been mandated by the U.S. Postal Service for use on their loading docks and is often described as the "Post Office Model". In such a device, the lip may be extended into the deck forming a short, nearly vertical barrier when the edge of dock leveler is in the stored position. This configuration prevents lightly loaded equipment such as, for example, postal carts, from running off the edge of the dock. One deficiency of the so-called "Post Office Model" is the fact that it does not have a stored position allowing unobstructed access to the dock surface. In particular, the closest thing to a stored position for the "Post Office Model" consists of the position in which it comprises a light capacity vertical barrier.

The following prior art is known to Applicant:

U. S. Pat. No. 3,486,181 to Hecker, Jr. et al. teaches a dockboard including a deck and a lip. In the stored position of the device, the lip is received between two plates. In that position, the deck portion is aligned in a common plane with the surface of the dock.

U. S. Pat. No. 3,636,578 to Dieter discloses a spring counterbalanced compact dockboard including a deck and a lip pivotably mounted together. Dieter does not teach any configuration in which the device may act as a barrier.

U. S. Pat. No. 3,974,537 to Ellis et al. teaches a lip extender for loading dock levelers that includes a deck and a lip pivotably mounted together including a toggle arm connected between the dock and the lip allowing the lip to drop onto the truck bed. Ellis et al. fail to teach a pivotable linkage having an over-center stop mechanism combined with a kick-out bar.

U. S. Pat. No. 4,065,824 to Ellis et al. teaches similar structure.

U. S. Pat. No. 4,665,579 to Bennett et al. teaches a counterbalancing mechanism for an edge-of-dock dockboard. Bennett et al. fail to teach or suggested a configuration in which their device may be used as a barrier.

U. S. Pat. No. 4,525,887 to Erlandsson et al. teaches a counterbalancing mechanism for the ramp of a dockboard. The Erlandsson et al. device includes only a short lip and does not include the over-center structure of the present invention.

U. S. Pat. No. 4,689,846 to Sherrod teaches a dock leveler apparatus including a deck and a lip pivotably mounted together. Sherrod fails to teach or suggest use of the device as a barrier nor does he teach the specific details of the linkages of the present invention.

U. S. Pat. No. 4,920,598 to Hahn discloses a dock leveler with automatic vehicle barrier. In Hahn, a device separate from the deck and lip may act as a vehicle barrier. This differs from the teachings of the present invention in which the deck and lip may be reconfigured to create the barrier. U. S. Pat. No. 5,040,258 to Hahn et al. is similar in that a structure separate from the deck and lip is employed as a vehicle barrier.

U. S. Pat. No. 4,935,979 to Walker et al. discloses a dock leveler operating apparatus in which the dock leveler includes a deck and a lip pivotably mounted together. A linkage such as a chain interconnects a leg pivotably attached to the deck. Walker et al. fail to teach or suggest use of their device as a barrier nor do they teach or suggest the linkages disclosed herein.

U. S. Pat. No. 5,157,801 to Alexander teaches a dock leveler having an automatically actuated vehicle barrier. In a similar manner to the Hahn patents, the vehicle barrier in Alexander consists of a structure that comprises a separate device from the structure and function of the deck and lip.

U. S. Pat. No. 5,195,205 to Cook discloses a dock leveler operating apparatus in which a handle is used to actuate the functions of the dock leveler. Cook fails to teach or suggest a configuration of the deck and lip thereof that operate as a barrier nor does he teach the other linkage instructions of the present invention.

U. S. Pat. No. 5,311,628 to Springer et al. discloses a dock leveler with an improved automatic material handling vehicle barrier. As is the case in Hahn, Hahn et al. and Alexander, the vehicle barrier of Springer et al. is a separate structure from the structures of the deck and lip. The same can be said of the teachings of U. S. Pat. No. 5,333,339 to Larsen.

U. S. Pat. No. 5,343,583 to Cook discloses a run-off guard and dock leveler locking apparatus. In Cook, in the run-off guard position, the lip is left unsupported. This differs from the teachings of the present invention.

U. S. Pat. No. 5,452,489 to Gelder et al. discloses a dock leveler with automatic end barrier. In Gelder et al., the end barrier is incorporated in a structure separate from the deck and lip. U. S. Pat. No. 5,457,838 to Gelder et al. teaches similar structure.

U. S. Pat. No. 5,553,343 to Alexander teaches a dock leveler with folding barrier lip. In Alexander, a configuration is provided in which the lip may be supported on a bracket. However, the barrier structure is separate and apart from the deck and lip.

SUMMARY OF THE INVENTION

The present invention relates to a dock leveler with run-off barrier configuration. The present invention includes the following interrelated objects, aspects and features:

(1) In a first aspect, the inventive dock leveler includes a faceplate, a deck, and a lip. The faceplate, as is customary, is mounted on the end of a dock. The deck is pivotably mounted to the faceplate and the lip is pivotably mounted to the deck.

(2) The deck is pivotably mounted to the faceplate via a pivotable interconnection comprising a first linkage including two legs pivotably mounted to each other as well as to each of the faceplate and the deck.

(3) The faceplate and the lip are interconnected with a pivoting connection comprising a second linkage including two arms pivotably connected together and pivotably connected to each of the faceplate and the deck, respectively. The second linkage includes structure allowing the arms to go to an over-center configuration but with a limit stop mechanism limiting the degree of pivoting in the over-center configuration.

(4) The faceplate may include one portion extending horizontally over the surface of the dock and a further portion depending vertically over the front face of the dock. Gusset means preferably comprising two gussets are provided on the second portion of the faceplate that extend outwardly therefrom and include recesses terminating in upwardly turned detents or fingers. In one configuration of the inventive dock leveler, the termination edge of the lip may be received within the recesses in the gussets so that the deck portion thereof acts as a sturdy barrier.

(5) The over-center feature incorporated into the legs interconnecting the faceplate and the lip allows the inventive dock leveler to be pivoted to a position in which the legs achieve the over-center configuration whereupon pivoting of the deck in the opposite direction causes the inventive device to extend outwardly and into engagement over the surface of a truck bed. In the event this procedure is carried out and a truck bed is not sufficiently close enough to the lip to capture it thereover, a kick-out device is incorporated into the undersurface of the deck to release the two legs from their over-center position allowing the lip to collapse downwardly to its stored configuration.

(6) In an alternative construction, an actuating lever may be mounted under the deck and having an interconnection with the second portion of the faceplate via a flexible connector such as, for example, a chain or cable.

As such, it is a first object of the present invention to provide a dock leveler with run-off barrier configuration.

It is a further object of the present invention to provide such a device in which, in one configuration thereof, it may act as a secure run-off barrier.

It is a still further object of the present invention to provide such a device in which an over-center mechanism allows easy extension of the deck and lip thereof over the surface of the bed of a truck or other vehicle.

It is a still further object of the present invention to provide such a device which may easily be operated merely through insertion of a lightweight handle in a recess provided therefor.

These and other objects, aspects and features of the present invention will be better understood from the following detailed description of the preferred embodiments when read in conjunction with the appended drawing figures.

BRIEF DESCRIPTION OF THE DRAWINGS

FIG. 11 shows a second embodiment of the present invention from a side and in a configuration corresponding to that of FIG. 1.

FIG. 12 shows a view from the same side as that of FIG. 11 with the deck and lip of the inventive device pivoting toward a barrier configuration.

FIG. 13 is a view of the second embodiment of the present invention corresponding to the view of FIG. 2 for the first embodiment thereof.

FIG. 14 shows a view of the second embodiment of the present invention corresponding to the view of FIG. 3 for the first embodiment of the present invention.

SPECIFIC DESCRIPTION OF THE PREFERRED EMBODIMENTS

Figure 3:
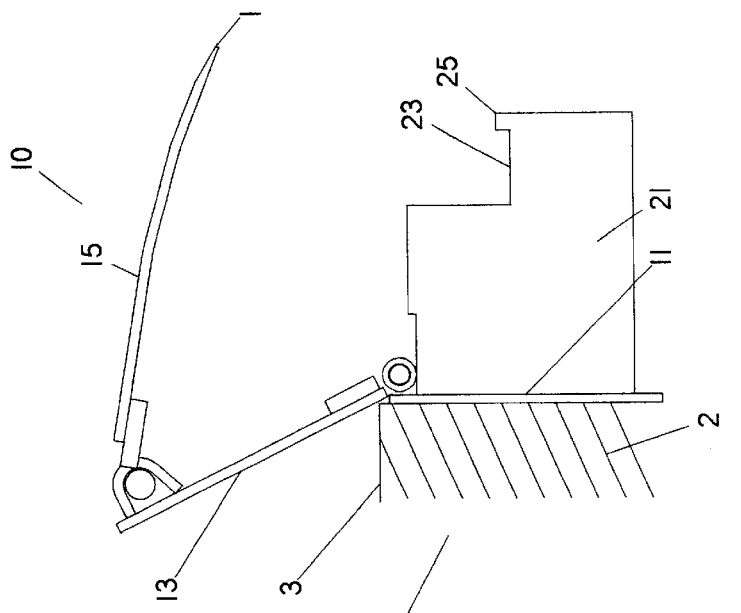
FIG. 3 shows a view from the same side as that of FIGS. 1 and 2 and depicting the inventive device moving to a position overlying the bed of a truck or other vehicle.
Figure 2:
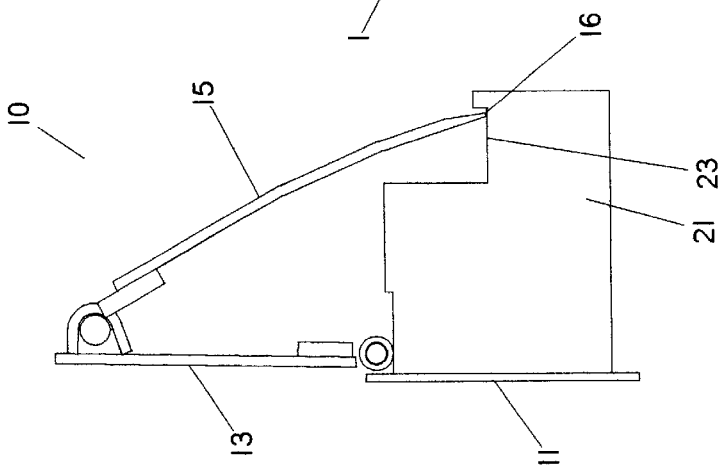
FIG. 2 shows a view from the same side as that of FIG. 1 showing the embodiment in its barrier configuration.
Figure 1:
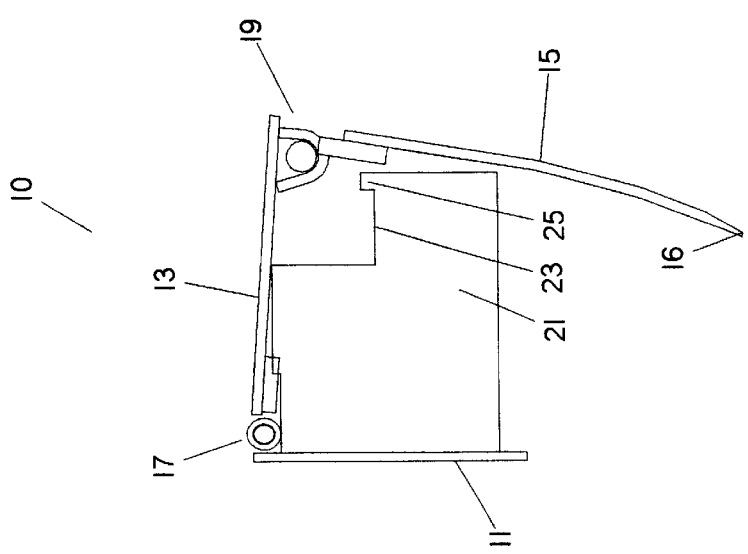
FIG. 1 shows a schematic side representation of a first embodiment of the present invention in a stored configuration thereof.

With reference, first, to FIGS. 1–3, a first embodiment of the present invention is generally designated by the reference numeral 10 and is seen to include a faceplate 11, a deck 13 and a lip 15. The faceplate 11 and deck 13 are interconnected through a pivot 17. The deck 13 and the lip 15 are interconnected through a pivot 19.

Spaced gussets 21 of which one is shown in FIGS. 1–3, extend forwardly from the faceplate 11. Each gusset 21 includes a recess 23 having a termination defined by an upstanding finger or detent 25. As seen in FIG. 2, the lip 15 has a termination edge 16 that may be engaged within the recess 23, in one configuration thereof, so that the deck 13 can act as a strong barrier.

Figure 5:
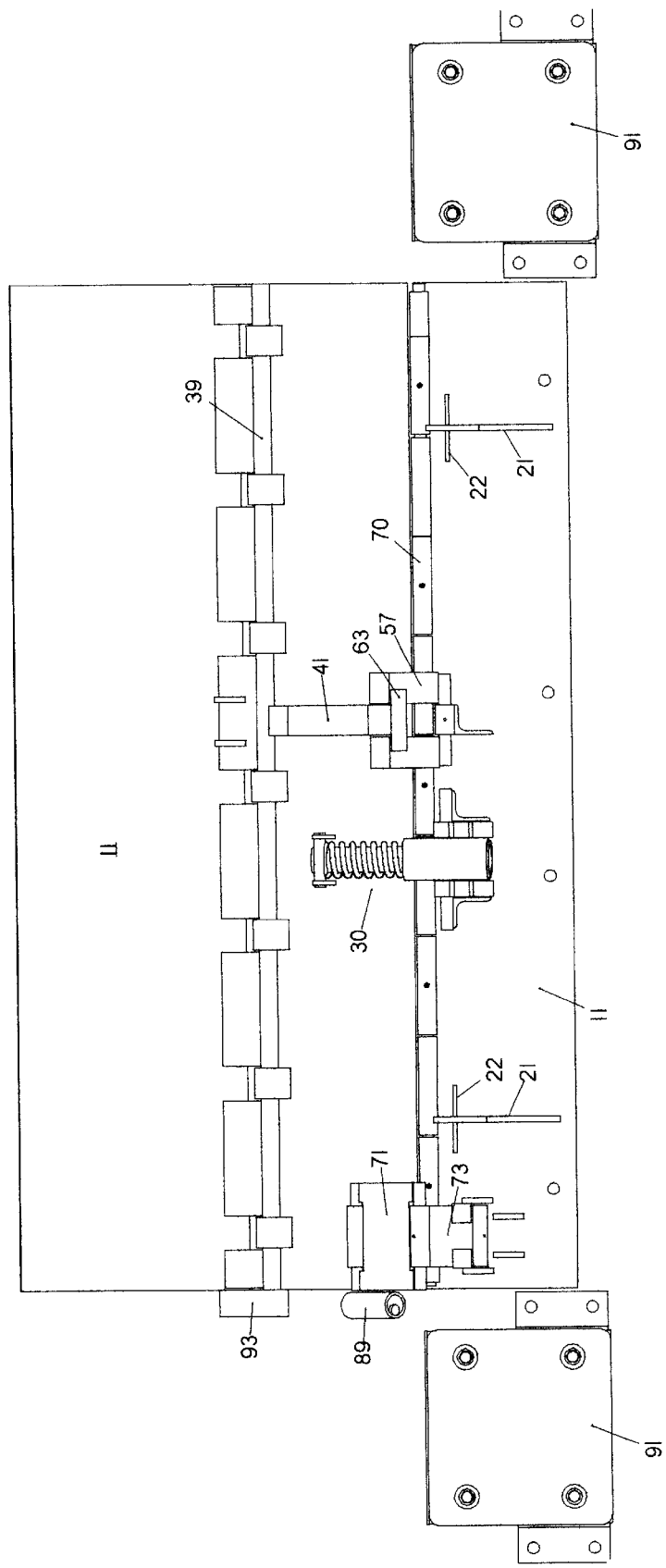
FIG. 5 shows a view of a second portion of the faceplate of the present invention and the undersides of the deck and lip thereof.

FIG. 1 shows the inventive device 10 in a storage position with the lip 15 hanging downwardly through the force of gravity generally parallel to the faceplate 11. As seen, for example, in FIG. 3, the faceplate 11 is mounted on the face 2 of a dock 1 which also has a horizontal surface 3 that is aligned in a generally coplanar fashion with the deck 13 and lip 15 when the inventive device 10 is in use connecting the dock 1 to the surface of the bed of a truck or other vehicle. FIG. 5 shows two gussets 21 which include bracing brackets 22.

Figure 4:
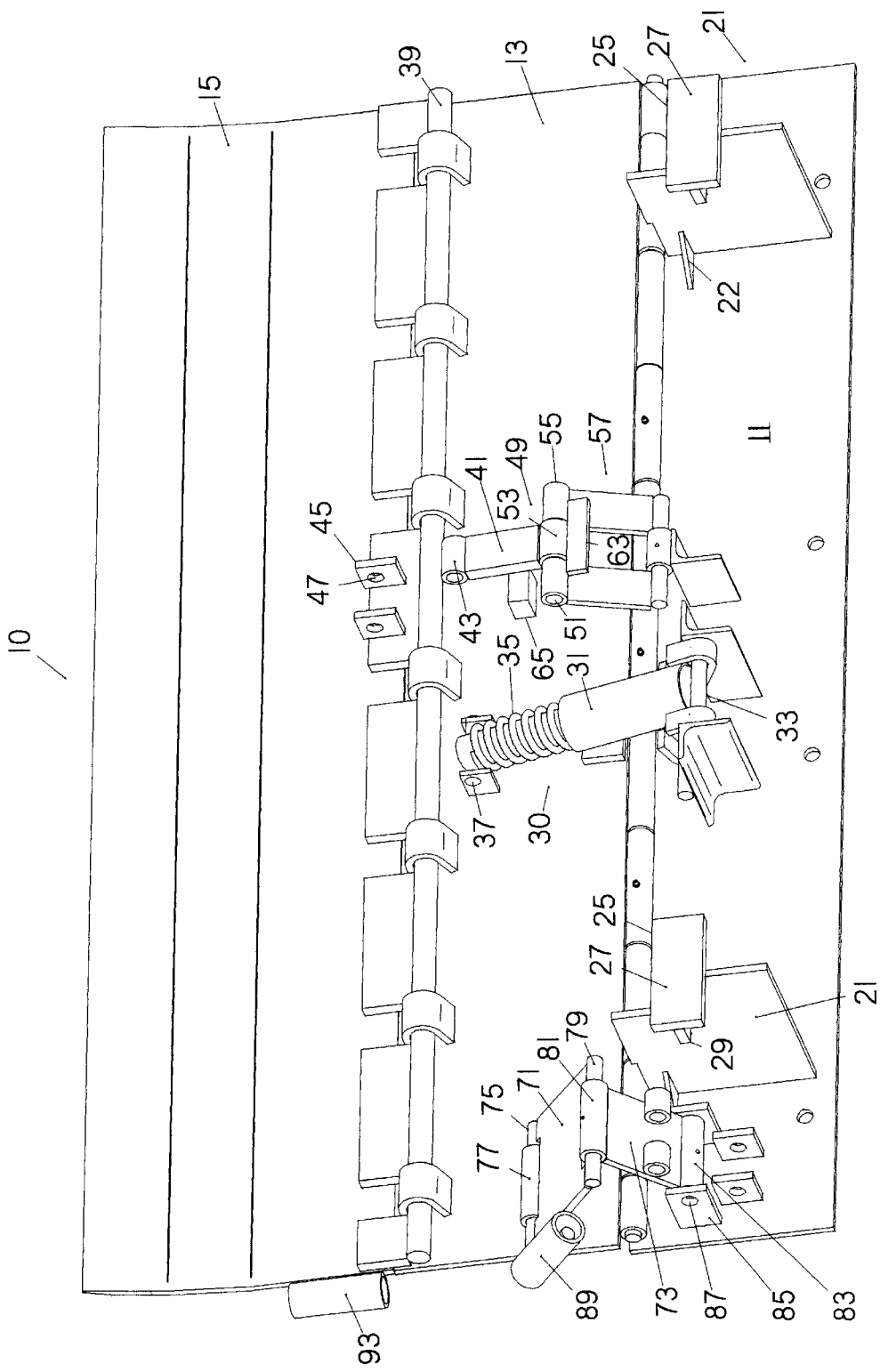
FIG. 4 shows a perspective view from the underside of the present invention.

With reference to FIGS. 4 and 5, certain details of the inventive device 10 may be seen more clearly. As seen, the gussets 21 may include forwardly facing plates 27 that define the upwardly extending fingers or detents 25 more schematically shown in FIGS. 1–3. The plates 27 may be interconnected to the body of each gusset 21 by virtue of a horizontally extending plate 29 and by any suitable means such as, for example, welding.

As seen in FIG. 4, a spring assembly 30 may be employed to provide a spring force to the deck 13 to assist in pivoting it away from the faceplate 11. As seen, the spring assembly 30 includes a cylindrical tube 31 mounted to the faceplate 11 through a pivot 33. The tube 31 receives a compression coil spring 35 at one end and the other end of the spring 35 extends outwardly therefrom and is affixed to the undersurface of the deck 13 by another pivot 37.

The faceplate 11 is pivotably connected to the deck 13 by an elongated hinge 70. Additionally, the lip 15 is interconnected directly with the faceplate 11 by virtue of a linkage 40 which includes a first arm 41 having a tube-like fitting 43 at its end remote from the faceplate 11 that is designed to be received in a complimentary bracket 45 consisting of two upstanding tabs having aligned holes 47 therethrough. A pin (not shown in FIG. 4) extends through the holes 47 and the fitting 43 to couple the arm 41 to the lip 13. At the other end of the arm 41, a further tube-like fitting 49 is provided that includes a pin 51 extending through fittings 53 and 55 (also tube-like) to pivotably interconnect the arm 41 to a further pair of arms 57. The arms 57 are interconnected by a cylindrical post 59 extending perpendicularly therebetween and received through a tube 61 affixed to the faceplate 11. As seen in FIG. 4, a limit stop 63 is attached to the tube 53 which is attached to the arm 41 and limits the degree of movement in an over-center direction of the arms 41 and 57 as will be explained in greater detail hereinafter. FIG. 4 also shows a kick-out block 65 mounted on the undersurface of the deck 13 and provided, as will be explained in greater detail hereinafter, to cause the arms 41 and 57 to be moved from an over-center configuration under certain circumstances.

Also seen in FIG. 4, is a piano-type hinge 70 that pivotably interconnects the faceplate 11 and the deck 13. An additional interconnection between the faceplate 11 and the deck 13 consists of a linkage including legs 71 and 73. As seen in FIGS. 4–5, the leg 71 includes one end with a rod 75 received within a tube 77 affixed to the underside of the deck 13 so that the leg 71 is pivotably mounted to the deck 13. A further rod 79 is affixed to the other end of the leg 71 and couples with a tube 81 affixed to one end of the leg 73, the other end of which includes a further tube 83 that is seen placed between two upstanding tabs 85, each of which has a hole 87 therethrough so that a pin (not shown) can be installed through the holes 87 and tube 83 to couple the leg 73 to the faceplate 11. A receiver tube 89 is mounted on the leg 71 and is sized and configured to receive a handle (to be described in greater detail hereinafter) that is used to actuate the inventive device.

With particular reference to FIG. 5, it is seen that to either side of the faceplate 11, bumpers 91 are mounted. These bumpers extend outwardly even beyond the forward extent of the gussets 21 so that a truck or other vehicle backing toward the dock 1 cannot damage the inventive device 10.

As further seen in FIG. 5, a further receiver 93 is mounted on a side of the lip 15 and is also sized to receive the same handle received in the receiver 89 for purposes to be described in greater detail hereinafter.

With reference, now, to FIGS. 6–10, an explanation of the operation of the first embodiment of the present invention will be made.

Figure 6:
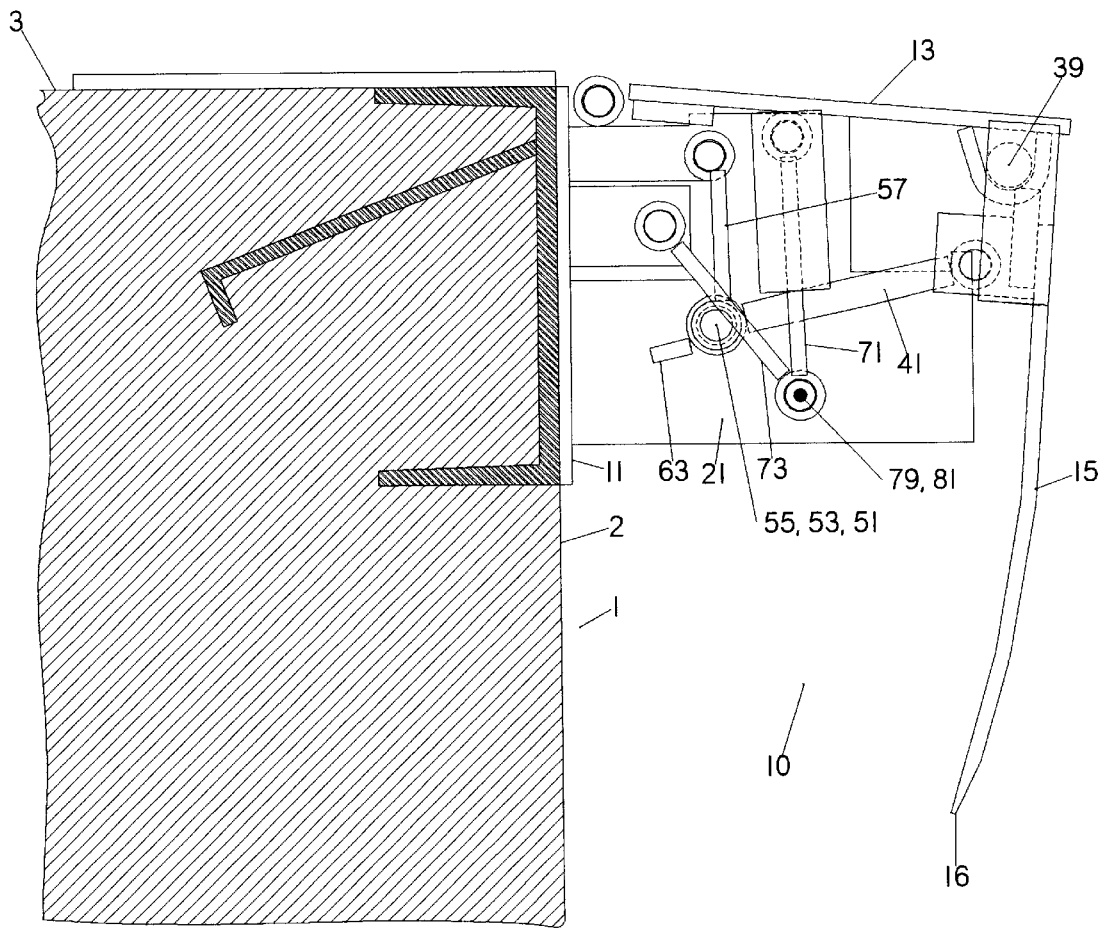
FIG. 6 shows an enlarged side view of the present invention in a similar configuration to that of FIG. 1.

Assuming that the inventive device 10 is in the stored configuration as illustrated in FIG. 6, the operator inserts the handle 95 within the receptacle 89 attached to the leg 71. The operator then manually moves the handle 95 rearward with the forces applied to the handle 95 being transferred through the leg 73 and the leg 71 to the bottom portion of the deck 13, thereby resulting in rotation of the deck 13 about the pivot 70 between the deck 13 and faceplate 11. As the deck 13 rotates about the faceplate 11, the lip 15 rotates through the force of gravity about the pivot 39.

As the deck 13 is rotated to an orientation beyond vertical, the distal edge 16 of the lip 15 falls under the force of gravity into the recesses 23 within the gussets 21. The deck 13 may be rotated around the pivotal end of the faceplate 11 to such a position that the angle between the faceplate 11 and the top surface 3 of the dock 1 is at a minimum amount and then the deck 13 is rotated in the opposite angle. During this process, the edge 16 of the lip 15 will still engage within the recesses 23 in the gussets 21 and will be prevented from escaping the recesses 23 by virtue of the upstanding lips 25.

Figure 7:
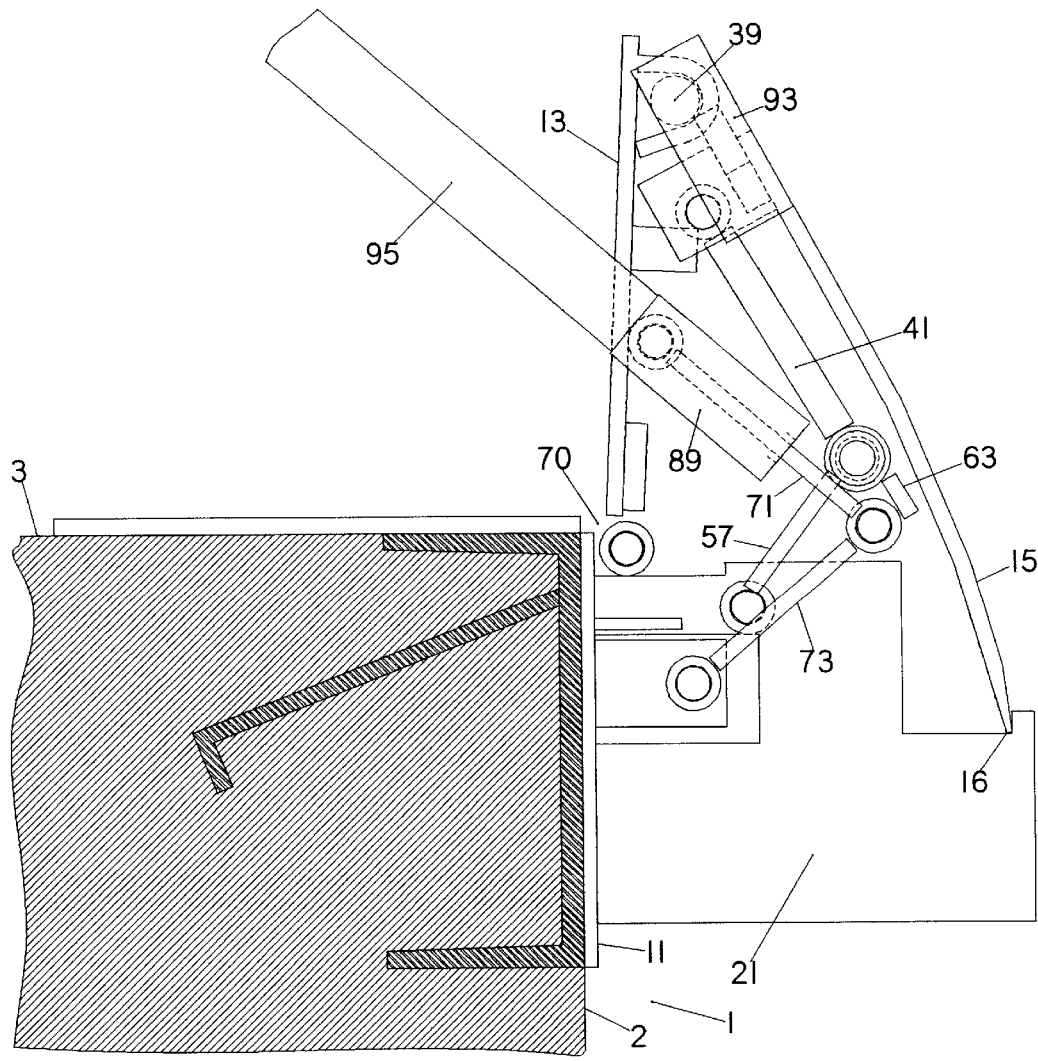
FIG. 7 shows an enlarged side view of the present invention in a similar configuration to that of FIG. 2.

This configuration is seen in FIG. 7 with the edge 16 of the lip 15 tightly engaging the lips 25 of the gussets 21, thereby forming a brace that prevents the deck 13 from rotating to the initial substantially horizontal position illustrated in FIG. 6. In this orientation, the inventive device 10 is in its barrier configuration and the handle 95 may be removed and stored until further use is required.

With reference to FIGS. 7–10, conversion of the inventive device 10 from a barrier device to a bridging device should be well understood. From the configuration of FIG. 7, the user inserts the handle 95 into the receiver 93 mounted on the side of the lip 15. Using the handle 95, the lip 15 is rotated about the pivot 39 and while the lip 15 is rotating, the deck 13 may also rotate about the pivot 70 until the angle between the deck 13 and the faceplate 11 (over the top of the surface 3) is at a minimum angle.

After the lip 15 has been rotated a sufficient degree about the pivot 39 with respect to the deck 13, the legs 41, 57 will rotate with respect to one another to a position of alignment and beyond alignment (FIG. 9) to an over-center configuration where they lock with respect to one another with the pivot stop 63 limiting the degree of movement in the over-center direction.

At this point, the operator removes the handle 95 from the receiver 89 and inserts the handle 95 into the receiver 93 mounted to the side of the lip 15. The operator then applies force toward the front of the dock on the handle 95 which transfers the force to the bottom of the deck 13 through the legs 41 and 73 causing the deck 13 to rotate about the pivot 70 (FIG. 9). The legs 41 and 73 are in the over-center configuration (FIG. 8), thus, rotation of the deck 13 about the pivot 70 causes the legs 41 and 73 to apply a force to the lower side of the lip 15 through the tabs or brackets 45, thereby rotating the lip 15 about the pivot 39.

As the deck 13 is rotated about the pivot 70 and the lip 15 is rotated about the pivot 39, the deck 13 and the lip 15 come to an extended co-planar position as the bottom of the lip 15 comes to rest on the surface 96 of the bed 97 of a truck or other vehicle.

Figure 8:
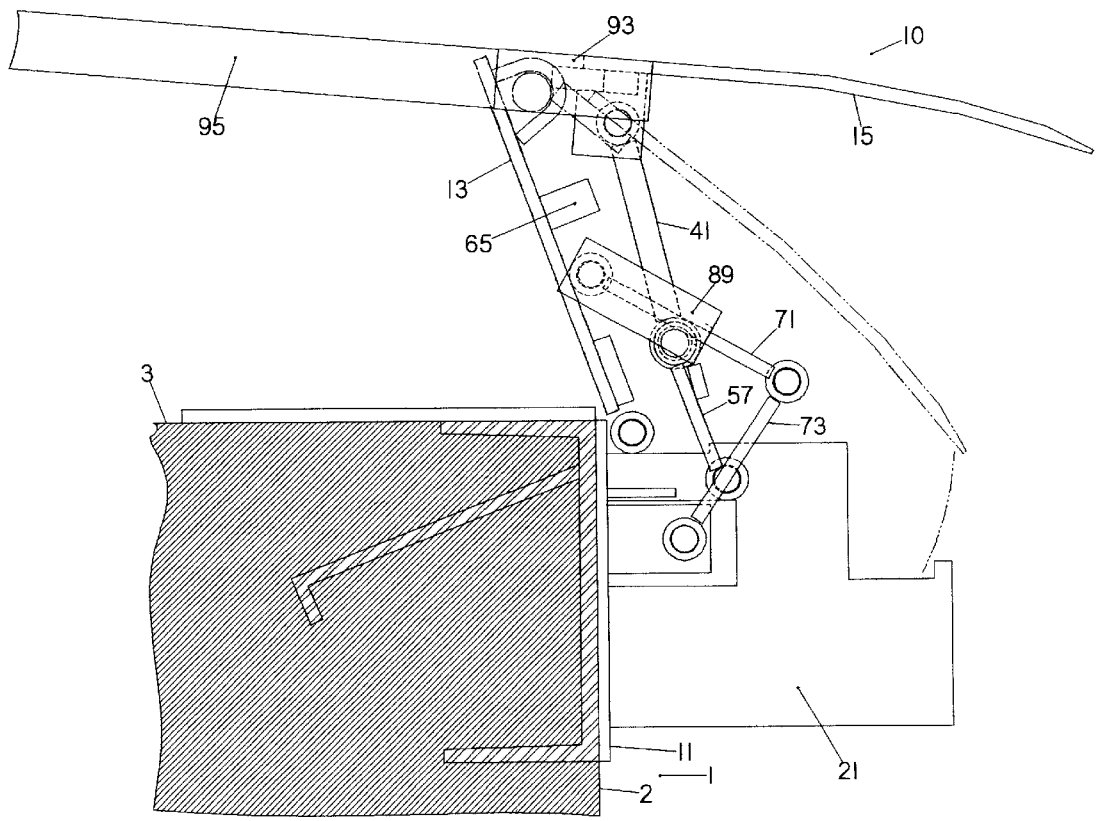
FIG. 8 shows an enlarged side view of the present invention in a similar configuration to that of FIG. 3.
Figure 9:
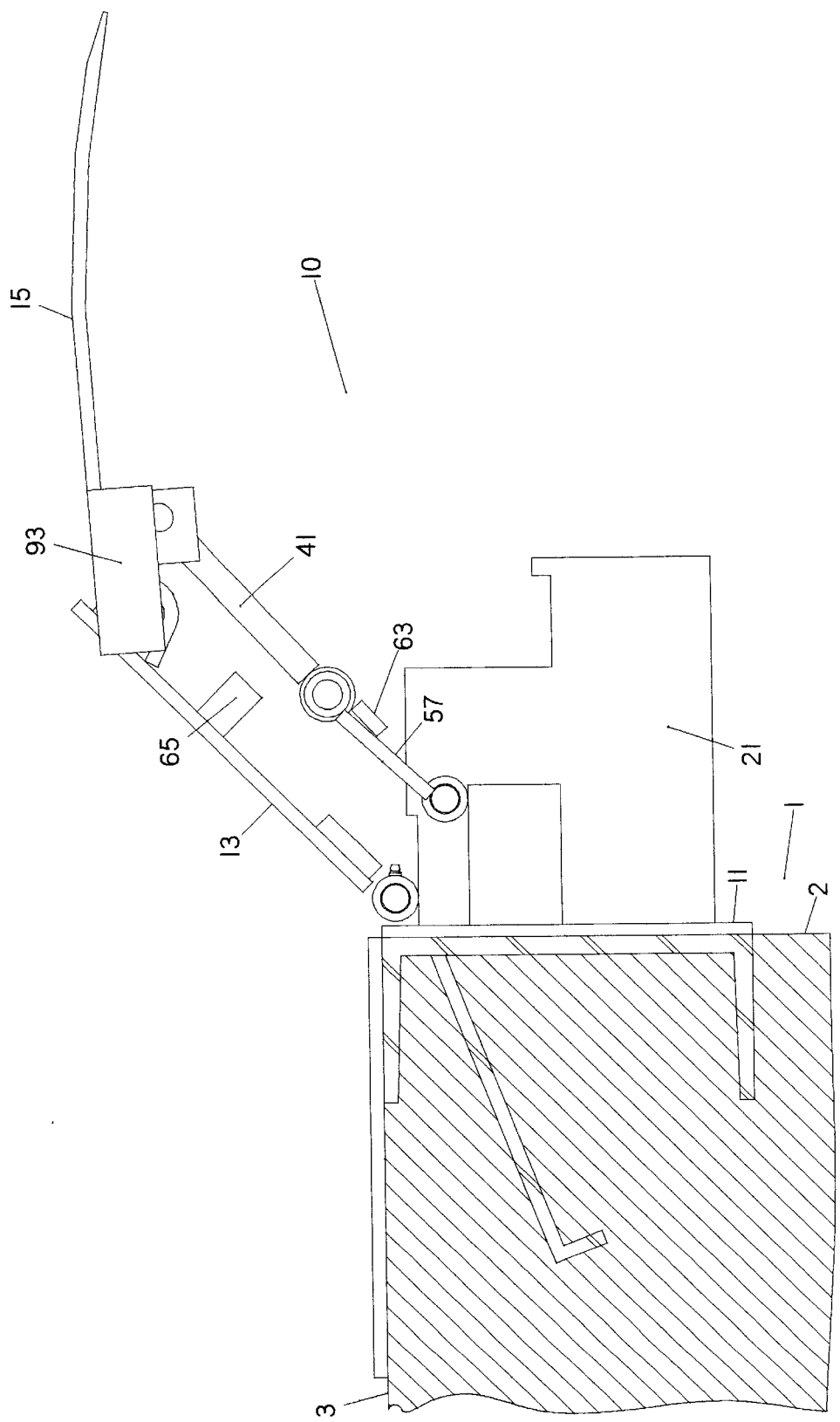
FIG. 9 shows a view in which the lip is pivoted with respect to the faceplate so that support legs thereof pivot to an over-center configuration.
Figure 10:
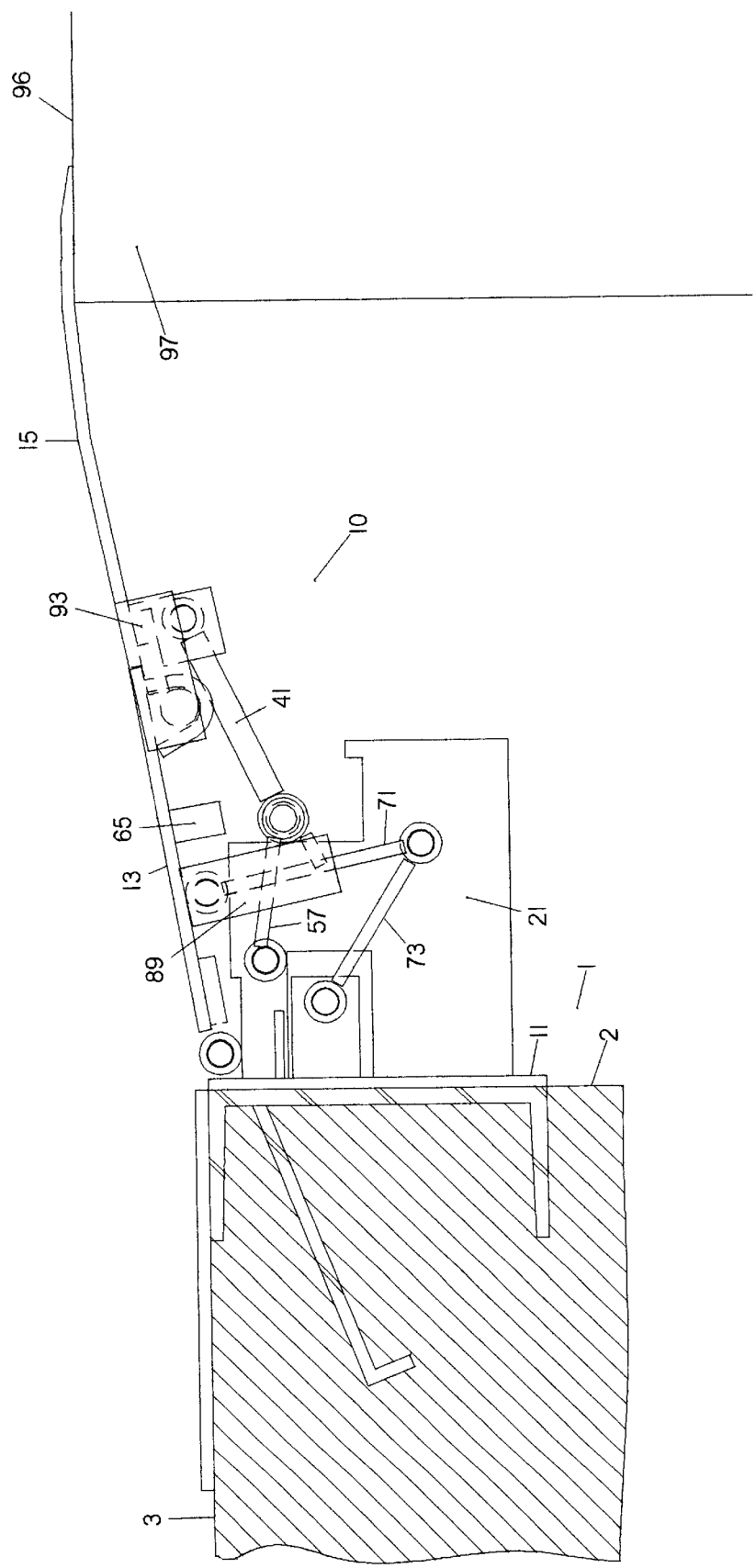
FIG. 10 shows the inventive device extended to overlie so that the lip thereof overlies the surface of the bed of a truck.

As may be seen from comparison of FIGS. 8, 9 and 10, as the process is completed with the distal end of the lip 15 resting on the surface 96, the over-center configuration of the legs 41 and 57 is relieved and the legs 41 and 57 are in their unlocked configuration. Due to this configuration, after loading or unloading is completed, and the vehicle moves away from the dock 1, as soon as the distal end of the lip 15 loses contact with the surface 96, through the force of gravity, the lip 15 will pivot downwardly along with the deck 13 back to the position shown in FIG. 6.

In the event the procedure described above with reference to FIGS. 8–10 is accomplished and no vehicle is located adjacent the loading dock 1, the kick-out bar 65 will engage the tubes 53, 55, and move the legs 41, 57 away from the over-center configuration thereof, unlocking them so that, as a result, the lip 15 and deck 13 will pivot through the force of gravity to the configuration shown in FIG. 6.

With reference to FIGS. 11–14, an alternative embodiment of the present invention is generally designated by the reference numeral 100 and is seen to include a faceplate 101, a deck 103, and a lip 105. Gussets 121 are provided and, as before, the faceplate 101 is pivotably mounted to the deck 103 through a pivot 107 and the deck 103 is pivotably mounted to the lip 105 by virtue of a pivot 109.

In the device 100, the receiver 93 is replaced with a lever 111 mounted to brackets 113 by a pivot 115. One end 117 of the lever has an opening 119 therethrough that allows attachment of one end of a chain 123, the other end of which is designated by the reference numeral 125 and is attached to a bracket 127 affixed to the faceplate 101. Of course, instead of a chain 123, a rope, a cable, or any other flexible device may be employed.

In the operation of the inventive device 100, as the operator pulls back on the handle 95' received within the remaining receiver 89, the operation of this embodiment is similar to that of the first embodiment except that as the deck 103 is rotated beyond the near vertical position, leaving the barrier configuration illustrated in FIG. 7, the slack in the chain 123 is removed, thereby transferring force to the lever 111 which rotates the lever 111 about its pivot 115. Therefore, the opposite end of the lever designated by the reference numeral 116 applies force against the lip 105 (see FIGS. 12 and 13) causing the lip 105 to rotate with respect to the deck 103 about the pivot 109. This rotation of the lip 105 via the lever 111 serves the same purpose as is the case in the first embodiment in which the lip 15 is rotated via the handle 95 and the receiver 93. Thereafter, the handle 95 is then pushed in the opposite direction to move the inventive device 100 toward and into the bridging configuration corresponding to FIG. 10.

Accordingly, an invention has been disclosed in terms of preferred embodiments thereof which fulfill each and every one of the objects of the invention as set forth hereinabove and provide a new and useful dock leveler with run-off barrier configuration of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. An edge of dock leveler for mounting on an edge of an existing loading dock, comprising:
   a) a faceplate fastened to said loading dock;
   b) a deck pivotably mounted to said faceplate;
   c) a lip pivotably mounted to said deck;
   d) said faceplate including a gusset including recess means for receiving and retaining a distal edge of said lip;
   e) said leveler including three configurations including:
      i) a first configuration in which said deck is generally horizontal and said lip hangs downwardly depending therefrom;
      ii) a second configuration in which said deck is generally vertical and supported by said distal edge of said lip received in said recess means of said gusset; and
      iii) a third configuration in which said deck is generally horizontal or slightly angled with respect to horizontal and said lip is extended generally co-planar with said deck and with said distal edge of said lip adapted to be supported by a surface of a floor of a vehicle adapted to be located adjacent said loading dock.

2. The leveler of claim 1, wherein a first linkage interconnects said faceplate and deck.

3. The leveler of claim 2, wherein a second linkage interconnects said faceplate and lip.

4. The leveler of claim 3, wherein said first linkage comprises a first leg pivotably connected to said faceplate and a second leg pivotably connected to said deck, said legs being pivotably connected together at a pivot at ends thereof remote from said faceplate and deck, respectively.

5. The leveler of claim 4, wherein said second linkage comprises a first arm pivotably connected to said faceplate and a second arm pivotably connected to said lip, said arms being pivotably interconnected by a further pivot at ends thereof remote from said faceplate and lip, respectively.

6. The leveler of claim 3, wherein said second linkage comprises a first arm pivotably connected to said faceplate and a second arm pivotably connected to said lip, said arms being pivotably interconnected by a pivot at ends thereof remote from said faceplate and lip, respectively.

7. The leveler of claim 6, wherein said pivot comprises an over-center mechanism whereby said arms can pivot from an orientation in said first configuration in which said arms define an angle therebetween toward an orientation in which said arms are linearly aligned and continually pivoting in a same direction to an over-center configuration beyond linear alignment wherein said arms again define an angle therebetween facing an opposite direction with respect to a direction toward which said first-mentioned angle faces.

8. The leveler of claim 7, wherein said arms include a limit stop limiting a degree of pivoting in a direction toward said overcenter configuration.

9. The leveler of claim 1, wherein said gusset comprises a first gusset and a second gusset.

10. The leveler of claim 9, wherein each of said gussets a comprises a plate extending generally perpendicularly from said faceplate, said recess means comprising a recess in each plate including an upstanding finger defining an extent of each recess most distal from said faceplate.

11. The leveler of claim 7, further including a kick-out bar mounted on an underside of said deck and aligned with said pivot, said kick-out bar being engageable with said pivot to move said arms away from said over-center configuration.

12. The leveler of claim 2, wherein said first linkage comprises a flexible link having a first end connected to said faceplate and a second end connected to a first end of an actuator handle, said actuator handle having a second end and being pivotably connected to said deck between said first and second ends thereof, said second end of said actuator handle being engageable with said lip.

13. The leveler of claim 12, wherein said actuator handle is pivotably mounted on a bracket mounted on an undersurface of said deck, said second end of said actuator handle being engageable with an undersurface of said lip.

14. The leveler of claim 12, wherein said flexible link comprises a chain.

15. The leveler of claim 1, further including a handle detachably connectable to said lip.

16. The leveler of claim 4, further including a handle detachably connectable to said second leg.

17. The leveler of claim 16, wherein said handle is also detachably connectable to said lip.

18. An edge of dock leveler for mounting on an edge of an existing loading dock, comprising:
   a) a faceplate fastened to said loading dock;
   b) a deck pivotally mounted to said faceplate;
   c) a lip pivotally mounted to said deck;
   d) said faceplate including two gussets, each gusset including recess means for receiving and retaining a distal edge of said lip, each gusset comprising a plate extending generally perpendicularly from said faceplate, said recess means comprising a recess in each plate including an upstanding finger defining an extent of each recess most distal from said faceplate;
   e) said leveler including three configurations including:
      i) a first configuration in which said deck is generally horizontal and said lip hangs downwardly depending therefrom;
      ii) a second configuration in which said deck is generally vertical and supported by said distal edge of said lip received in said recess means of said gusset means; and
      iii) a third configuration in which said deck is generally horizontal or slightly angled with respect to horizontal and said lip is extended generally co-planar with said deck and with said distal edge of said lip supported by a surface of a floor of a vehicle located adjacent said loading dock, said leveler further including:
   f) a first linkage interconnecting said faceplate and deck;
   g) a second linkage interconnecting said faceplate and lip;
   h) a handle detachably connectable to either said lip or said first linkage.

19. The leveler of claim 18, wherein said first linkage comprises a first leg pivotably connected to said faceplate and a second leg pivotably connected to said deck, said legs being pivotably connected together at ends thereof remote from said faceplate and deck, respectively, said handle being detachably connectable to said second leg.

20. The leveler of claim 19, wherein said second linkage comprises a first arm pivotably connected to said faceplate and a second arm pivotably connected to said lip, said arms being pivotably interconnected by a pivot at ends thereof remote from said faceplate and lip, respectively, said pivot comprising an over-center mechanism whereby said arms can pivot from an orientation in said first configuration in which said arms define an angle therebetween toward an orientation in which said arms are linearly aligned and continually pivoting in a same direction to an over-center configuration beyond linear alignment wherein said arms again define an angle therebetween facing an opposite direction with respect to a direction toward which said first-mentioned angle faces.

* * * * *